2,783,226

ESTERS OF CORTICAL HORMONES

David H. Gould, Leonia, and Hershel L. Herzog, Mountain View, N. J., assignors to Schering Corporation, Bloomfield, N. J., a corporation of New Jersey No Drawing. Application February 3, 1955, Serial No. 486,037

10 Claims. (Cl. 260—239.55)

This invention relates to the novel esters of $\Delta^1$-cortical hormones which show improved duration of activity over the free hormones. The hormones which are improved by our process of esterification are $\Delta^1$-dehydrocortisone, $\Delta^1$-dehydrocortisol, $\Delta^1$-dehydro - corticosterone, $\Delta^1$-dehydro - 11 - desoxy - corticosterone, $\Delta^1$ - dehydro - 11 - desoxy - cortisone, $\Delta^1$ - dehydro - 17 - desoxy - cortisone, $\Delta^1$ - dehydro - aldo - sterone, and $\Delta^1$ - dehydro - 9$\alpha$ - halo-cortisone and $\Delta^1$-dehydro-9$\alpha$-halo-cortisol in which the halogen atom is bromide or chloride. The $\Delta^1$-hormones are described in the co-pending application of Arthur Nobile, Serial No. 449,257, filed August 11, 1954.

We have found that these new highly active hormones may be protected from rapid destruction in the body by esterification with organic carboxylic acids such as: cyclohexanecarboxylic acid, 4-methylcyclohexanecarboxylic acid, 3-ethylcyclohexylacetic acid, cyclohexylpropionic acid, cyclopentylpropionic acid, phenylacetic acid, trimethylacetic acid, t.-butylacetic acid, butoxybutyric acid, ethoxycaproic acid, methylthiovaleric acid, isopropylthioacetic acid, phenylthioacetic acid, caproic acid, isobutyric acid, enanthic acid, isocaprylic acid, cyclohexylcaproic acid, undecylenic acid, 2-ethylbutyric acid, toluic acid and ethoxybenzoic acid.

Particularly we have found that acids of the aryloxyalkanoic and furoic acid families give outstandingly superior duration of hormonal activity, thus providing a more efficient, convenient and useful therapy than can be obtained with the parent hormones. Typically useful acids of these families are: phenoxyacetic acid, p-chlorophenoxyacetic acid, 2,4 - dichlorophenoxyacetic acid, 2,4,5 - trichlorophenoxyacetic acid, 5 - chlorofuroic acid, 5 - methylfuric acid, 5 - bromofuroic acid, 4 - bromophenoxyacetic acid, 4 - methylphenoxyacetic acid, 4 - methoxyphenoxyacetic, 4 - t. - butylphenoxyacetic acid, 5-t.-butylfuroic acid, furoic acid and phenoxypropionic acid.

It has been shown pharmacologically and clinically that $\Delta^1$-dehydrocortical hormones are three to four times more potent than the corresponding natural 1,2-saturated cortical hormones. In particular, as an example, an arthritic patient who could not be satisfactorily maintained with as much as 75 mg. of cortisone or hydrocortisone (cortisol) daily, was brought into startling remission and maintained with 20–25 mg. of either $\Delta^1$-dehydrocortisone or $\Delta^1$-dehydrocortisol. As potent as these new hormones are, however, they nevertheless have the disadvantage of rapid destruction in the body, so that wasteful and inconvenient daily treatment must be maintained.

The products of the invention, however, obviate this difficulty. For example, in adrenalectomized mice, injection of 0.25 mg. of $\Delta^1$-dehydrocortisone or $\Delta^1$-dehydrocortisol or their acetates causes eosinopenia for from two to four days. A similar injection of $\Delta^1$-dehydrocortisone 21-(2',4'-dichlorophenoxyacetate) lasts 12–20 days; its 21-(5'-bromofuroate) lasts 10–18 days; the $\Delta^1$-dehydrocortisol 21-furoate lasts 10–16 days; and its 21-(4'-t.-butylphenoxyacetate) lasts 14–20 days.

In another test, an injection of $\Delta^1$-dehydrocortisone 21-(5'-chlorofuroate) in rats caused the weight of the thymus gland to be decreased for a period from five to eight times longer than the free hormone; and the $\Delta^1$-dehydrocortisol 21 - (4'-tert-butylphenoxyacetate) caused thymus involution from four to six times longer than the free hormone. These tests are standard indications of gluco-corticoid (i. e., antiarthritic) activity. Likewise, the mineralo-corticoid activity of hormones is enhanced by esterification with these acids. Thus $\Delta^1$-dehydro-11-desoxycorticosterone 21-(4'-chlorophenoxyacetate) maintains the life of adrenalectomized mice five to seven times longer than the free hormone, and $\Delta^1$-dehydroaldosterone 21-furoate maintains life six to ten times longer than the corresponding hormone.

In human therapy, the same protection of the hormone from destruction is observed, with concomitant extension of duration of the therapeutic level of activity. Thus, one or two injections per week of $\Delta^1$-dehydrocortisone 21-furoate or $\Delta^1$-dehydrocortisol 21-(4'-t.-butylphenoxyacetate) replace 7 daily medications with the free hormone. Similarly 50–100 mg. injections of $\Delta^1$-dehydrocorticol 21-(5'-t.-butylfuroate) or $\Delta^1$-dehydrocortisone 21-(4'-chlorophenoxyacetate) have activity lasting 7 to 10 days rather than the one-day effectiveness of the free hormone.

The products of the invention may be administered in the usual manner of cortical hormones. Thus they may be compounded into tablets with inert material for oral or sublingual use. Another form commonly used is an ointment or lotion for topical use. Generally the most effective mode of administration is by injection intramuscularly, subcutaneously or intra-articularly, of solutions or suspensions in oil or aqueous media.

The products of our invention may be prepared in several ways, the simplest being esterification of the corresponding free hormones, for example, by treatment with the hydroxysteroid with the corresponding acid anhydride or chloride in the presence or absence of a base; or by treatment of the hydroxysteroid hormone with the free acid in the presence of an acid catalyst under dehydrating conditions.

The products of the invention may also be prepared by esterification of intermediates in the preparation of the hormones, using these esters rather than acetate as protecting groups. For example, the following equations show the preparation of hormone esters of the invention through preparation of esterified intermediates:

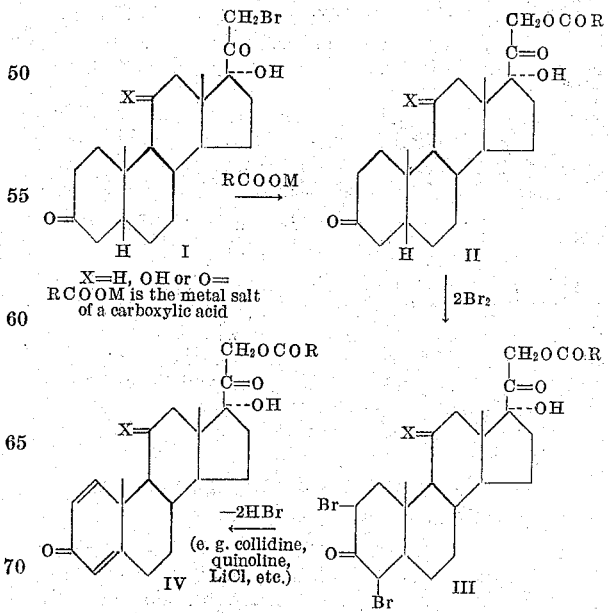

Another procedure leading to esters of Δ¹-dehydrocortisone or Δ¹-dehydrocortisol, for example, is the treatment of the corresponding cortisone or cortisol ester with a dehydrogenating micro-organism, e. g., according to the process described in the co-pending application Serial No. 449,257, filed August 11, 1954, of Arthur Nobile for the preparation of Δ¹,⁴-3-ketosteroids:

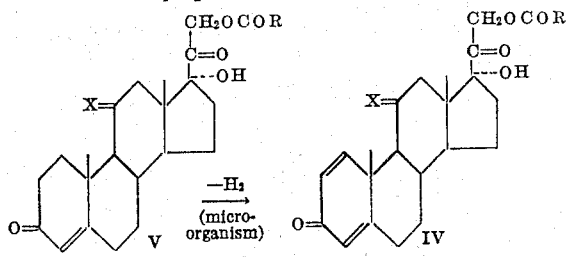

Another procedure for the preparation of some of the products of our invention is illustrated in the formulas given below:

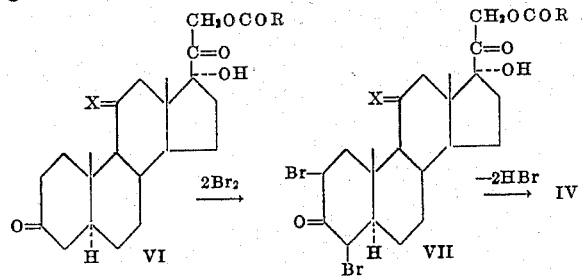

The examples given describe the invention in part but are not to be taken as limiting the scope thereof.

*Example 1.—1,4-pregnadiene-21-ol-3,20-dione 21-(5'-bromofuroate)*

One-half gram of 1,4-pregnadiene-21-ol-3,20-dione is dissolved in 4 ml. of dry pyridine and treated with 0.4 g. of 5-bromo-2-furoylchloride. After being stirred one-half hour, the mixture is poured into dilute hydrochloric acid and the precipitated ester is filtered off. Purification is achieved by crystallization from an acetone-hexane 1:2 mixture.

*Example 2.—1,4-pregnadiene-11β,17α,21-triol-3,20-dione 21-furoate*

One gram of 1,4-pregnadiene-11β,17α,21-triol-3,20-dione is dissolved in 10 ml. of dry pyridine, and chilled in an ice-bath. After dropwise addition of a mixture of 0.65 g. of furoic anhydride in 3 ml. of pyridine the mixture is stirred 4 hours in the ice-bath and poured into an ice-sulfuric acid mixture. The mixture is extracted with methylene chloride and the solution is washed with dilute sodium bicarbonate and water. The dried solution is filtered, evaporated to a crystalline residue and crystallized from dilute acetone to give the pure ester, M. P. 240–2° C. (dec.).

*Example 3.—1,4-pregnadiene-11β,17α,21-triol-3,20-dione 21-(5'-t-butylfuroate)*

One gram of 1,4-pregnadiene-11β,17α,21-triol-3,20-dione is dissolved in 10 ml. of pyridine, chilled with stirring in an ice bath and treated with 0.6 g. of 5-t-butylfuroylchloride. After stirring overnight, the mixture is poured into dilute sulfuric acid and the solid extracted with ether. The crude product is crystallized from a benzene-methanol mixture to give the pure product which melts with decomposition at about 237–239° C.

*Example 4.—1,4-pregnadiene-11β,21-diol-3,20-dione 21-(4'-methylphenoxyacetate)*

200 mg. of 1,4-pregnadiene-11β,21-diol-3,20-dione (M. P. 215–220° C.) in 5 ml. of pyridine is treated with 135 mg. of 4-methylphenoxyacetylchloride (B. P. 110–112° C.). The mixture is allowed to stand overnight at 5° C. and poured into water. The product is extracted with chloroform and the chloroform layer is washed neutral with 5% hydrochloric acid, aqueous sodium bicarbonate and water. The dried solution is evaporated and the residue is dissolved in 1:1 benzene-hexane and chromatographed on activated sodium silicate. The fraction eluted with 1:1 benzene-hexane is evaporated to give the product. Further purification is achieved by crystallization from 1:1 benzene-hexane.

*Example 5.—1,4-pregnadiene-11β,17α,21-triol-3,20-dione 21-(5'-chlorofuroate)*

One gram of 1,4-pregnadiene-11β,17α,21-triol-3,20-dione is dissolved in 10 ml. of pyridine and poured onto 0.53 g. of 5-chlorofuroyl chloride in 4 ml. of pyridine. The mixture is stirred in an ice-bath for one hour and allowed to stand 16 hours at room temperature. The reaction is poured into water and the precipitate collected. Purification is obtained by crystallization from a methanol-benzene mixture.

*Example 6.—1,4-pregnadiene-11β,17α,21-triol-3,20-dione 21-(4'-t-butylphenoxyacetate)*

1 g. of 1,4-pregnadiene-11β,17α,21-triol-3,20-dione in 10 ml. of pyridine is treated with 0.79 g. of 4-t-butylphenoxyacetylchloride. The mixture is stirred 3 hours and allowed to stand three days. The mixture is poured into aqueous sulfuric acid and the precipitate is extracted by washing thrice with benzene. The benzene solution is washed neutral with saturated sodium bicarbonate solution and water, dried, and treated with activated charcoal. The crude ester is crystallized from aqueous methanol to give the pure ester, which melts with the decomposition at 203–6° C.

*Example 7.—1,4-pregnadiene-21-ol-3,20-dione 21-phenoxyacetate*

Five grams of 1,4-pregnadiene-21-ol-3,20-dione is dissolved in 25 ml. of dry benzene, cooled with stirring to 15° C. and treated with 2.85 g. of phenoxyacetyl chloride in 15 ml. of benzene added dropwise over a period of fifteen minutes. The solution is stirred 3 hours at 15° C. and then washed with dilute hydrochloric acid (2 N), followed by water, 10% sodium bicarbonate solution and finally water until the benzene layer is neutral. The dried solution is filtered through a ½-inch pad of activated alumina and evaporated to dryness. The residue is crystallized from hexane to give the pure ester.

*Example 8a.—Pregnane-3α,17α,21-triol-11,20-dione 21-(2',4'-dichlorophenoxyacetate)*

One hundred grams of pregnane-3α,17α-diol-11,20-dione is dissolved in 1 l. of chloroform containing 1% ethanol, and the mixture is chilled to 10° C. and treated with 12 g. of gaseous hydrogen bromide. After being chilled to —20° C. and while holding below —10° C., the mixture is treated with a solution of 48 g. of bromine in 650 ml. of chloroform over a period of three hours. The reaction is then concentrated in vacuo to 250 ml. below 25° C. To the solution is added 800 ml. of acetone followed by 200 g. of potassium 2,4-dichlorophenoxyacetate (obtained by vacuum evaporation of a methanol solution of 2,4-dichlorophenoxyacetic acid neutralized by potassium carbonate). The mixture is treated with 200 ml. of water, mixed well and refluxed 16 hours. The solvent is then removed by steam distillation after adding 500 ml. of water, and the mixture is heated 30 min. at 100° C. The product is collected by filtration and washed three times with hot water. This may be crystallized from aqueous methanol to give pure pregnane-3α,17α,21-triol-11,20-dione 21-(2',4'-dichlorophenoxyacetate).

Example 8b.—Pregnane-17α,21-diol-3,11,20-trione 21-(2',4'-dichlorophenoxyacetate)

The crude damp residue from Example 8a is dissolved in 1170 ml. of acetone and 100 ml. of water. The solution is chilled to −5° C. and the pH is adjusted to 2.4 with 6 N hydrochloric acid (0.2–1.0 ml.). In the dark 89.8 g. of N-bromsuccinimide is added and the mixture held at −5° C. for one hour. To the red solution is added enough sodium sulfite solution (123 g. of sodium sulfite in 670 ml. of water) to bring the pH to 4.5–5.0 and the mixture is steam distilled until the temperature reaches 100° C. for one hour. The product is filtered off and washed three times with hot water and dried. The crude pregnane-17α,21-diol-3,11,20-trione 21-(2',4'-dichlorophenoxyacetate) may be purified by crystallization from an acetone-methanol mixture.

Example 8c.—2,4-dibromopregnane-17α,21-diol-3,11,20-trione 21-(2',4'-dichlorophenoxyacetate)

Ten grams of the produce of Example 8b is dissolved in 250 ml. of glacial acetic acid, stirred, and treated dropwise with solution of 5.85 g. of bromine in 50 ml. of acetic acid as rapidly as the color is discharged in about thirty minutes. Addition of water precipitates the crude dibromide which is filtered off. Crystallization from acetone-methanol gives the pure 2,4-dibromopregnane-17α,21-diol-3,11,20-trione 21-(2',4'-dichlorophenoxyacetate).

Example 8d.—1,4-pregnadiene-17α,21-diol-3,11-20-trione 21-(2',4'-dichlorophenoxyacetate)

Five grams of the product of Example 8c is dissolved in 25 ml. of quinaldine and held at 95–100° C. for 16 hours. The mixture is then steam distilled to remove quinaldine and the solid is extracted with ether. The solution is washed with dilute sulfuric acid and water, dried and evaporated to a residue. Chromatography from benzene on activated magnesium silicate gives the pure 1,4-pregnadiene-17α,21-diol-3,11,20-trione 21-(2',4'-dichlorophenoxyacetate), which is eluted with benzene and has a rotation of about $[\alpha]_D + 116$ (dioxane).

Example 9a.—Pregnane-11β,17α,21-triol-3,20-dione 21-(4'-chlorophenoxyacetate)

In the same manner as in Example 3, two grams of pergnane-11β,17α,21-triol-3,20-dione is treated with 1.40 g. of 4-chlorophenoxyacetyl chloride. The crude product is dissolved in methanol and concentrated to give crystalline pregnane-11β-17α,21-triol-3,20-dione 21-(4'-chlorophenoxyacetate).

Example 9b.—1,4-pregnadiene-11β,17α,21-triol-3,20-dione 21-(4'-chlorophenoxyacetate)

One gram of the product of Example 10a is brominated as in Example 9a with 0.62 g. of bromine in acetic acid. The crude water-precipitated dibromide is dried and dissolved in 10 ml. of toluene and 5 ml. of 2,4,6-collidine. The mixture is refluxed 16 hours and steam distilled to remove solvents. The crude product is worked up and chromatographed as in Example 9b, and the benzene eluate is crystallized from methanol to give 1,4-pregnadiene-11β,17α,21-triol-3,20-dione 21-(4'-chlorophenoxyacetate), M. P. 184–186° C.

Example 10a.—Allopregnane-11β,17α,21-triol-3,20-dione 21-(4'-chlorophenoxyacetate)

Ten grams of 4-pregnene-11β,17α-21-triol-3,20-dione is esterified as in Example 3 with 7.0 g. of 4-chlorophenoxyacetyl chloride. The crude product is crystallized from 95% ethanol to give pure 4-pregnene-11β-17α,21-triol-3,20-dione 21-(4'-chlorophenoxyacetate).

Five grams of this ester is suspended in 150 ml. of ethylacetate and 1 g. of 5% palladium on charcoal is added. The mixture is shaken with hydrogen until one equivalent (231 cc. at 25° C.) is absorbed and the uptake stops. The mixture is filtered and the solution is concentrated to 25 ml. The product which crystallizes out is filtered off and dried. It may be further crystallized from acetone to give allopregnane-11β,17α,21-triol-3,20-dione 21-(4'-chlorophenoxyacetate).

Example 10b.—Allopregnane-11β,17α,21-triol-3,20-dione

Ten grams of allopregnane-11β,17α,21-triol-3,20-dione 21-acetate obtained as in the co-pending application, Serial No. 466,207, filed November 1, 1954, of E. P. Oliveto and D. H. Gould is dissolved in 200 ml. of methanol and treated with a solution of 2.95 g. of potassium bicarbonate in 25 ml. of water. The mixture is stirred for 24 hours with nitrogen slowly bubbling through. Acetic acid is then added to neutrality 50 ml. of water is added and the mixture concentrated in vacuo to 125 ml. The precipitate is collected, washed with water and crystallized from dilute methanol to give allopregnane-11β,17α,21-triol-3,20-dione.

Example 10c.—Allopregnane-11β,17α,21-triol-3,20-dione 21-(4'-chlorophenoxyacetate)

Five grams of the product from Example 10b is esterified as in Example 3 with 3.5 g. of 4-chlorophenoxyacetyl chloride. The product is crystallized from benzene-methanol to give allopregnane-11β,17α,21-triol-3,20-dione 21-(4'-chlorophenoxyacetate), the same product as in Example 10a.

Example 11.—1,4-pregnadiene-11β,17α,21-triol-3-20-dione 21-(4'-chlorophenoxyacetate)

Two grams of the product of Example 10a is covered with 25 ml. of glacial acetic acid, stirred and treated dropwise with 1.25 g. of bromine in 5 ml. of acetic acid. After the color disappears, water is added and the crude disbromide is filtered off and dried.

1 g. of the dibromide is suspended in 5 ml. of diethylaniline and warmed at 95–100° C. on the steam bath with stirring for six hours. The mixture is then poured into dilute sulfuric acid and extracted with methylene chloride. The solution is dried and evaporated and the residue crystallized thrice from methanol-acetone to give 1,4-pregnadiene-11β,17α,21-triol-3,20-dione 21-(4'chlorophenoxyacetate), M. P. 184–196° C., the same product as from Example 9b.

Example 12.—1,4-pregnadiene-17α,21-diol-3,11,20-trione 21-(4'-chlorophenoxyacetate)

One gram of 1,4-pregnadiene-17α,21-diol-3,11,20-trione is esterified as in Example 3 with 0.71 g. of 4-chlorophenoxyacetyl chloride. The residue is crystallized from a methylene chloride-hexane mixture to give 1,4-pregnadiene - 17α,21 - diol - 3,11,20-trione 21 - (4' - chlorophenoxyacetate), M. P. 180–182° C.

Example 13.—1,4-pregnadiene-17α,21-diol-3,11,20-trione 21-(4'-methoxyphenoxyacetate)

As in Example 12, two grams of 1,4-pregnadiene-17α,21-diol-3,11,20-trione is esterified using 1.39 g. of 4-methoxyphenoxyacetyl chloride. The residue of product is dissolved in benzene and passed through a column of activated magnesium silicate. The effluent is concentrated. Five ml. of methanol is added and the crystalline 1,4-pregnadiene-17α,21 - diol - 3,11,20 - trione 21 - (4' - methoxyphenoxyacetate) obtained on chilling is collected by filtration and dried in vacuo, M. P. 130–135° C. (loss of solvate).

Example 14.—1,4-pregnadiene-17α,21-diol-3,11,20-trione 21-(5'-bromofuroate)

Two grams of 1,4-pregnadiene-17α,21-diol-3,11,20-trione is dissolved in 20 ml. of mixed picolines and treated with 1.37 g. of 5-bromo-2-furoyl chloride (M. P. 60–65° C.). The mixture is stirred 5 hours at room temperature and diluted with ether. The solution is washed thrice with 5% sulfuric acid, water, twice with 5% sodium bicarbonate and finally with water until neutral. The residue obtained on evaporation of the dried solution is crystallized from a benzene-methanol mixture to give the desired product.

*Example 15.—1,4-pregnadiene-11β,17α,21-triol-3,20-dione 21-phenoxyacetate*

One gram of 1,4-pregnadiene-11β,17α,21-triol-3,20-dione is esterified as in Example 3 with 0.52 g. of phenoxyacetyl chloride. The reaction is worked up to give a crude which is crystallized from aqueous methanol to give the desired ester, M. P. 196–199° C.

*Example 16.—1,4-pregnadiene-11β,17α,21-triol-3,20-dione 21-(4'-bromophenoxyacetate)*

One gram of 1,4-pregnadiene-11β,17α,21-triol-3,20-dione is treated with 0.87 g. of 4-bromophenoxyacetyl chloride as in Example 15. The crude product is crystallized from acetone-hexane to give 1,4-pregnadiene-11β,17α,21-triol - 3,20 - dione 21 - (4' - bromophenoxyacetate).

*Example 17.—1,4-pregnadiene-17α,21-triol-3,11,20-trione 21-furoate*

Using the procedure of Example 3, 1 g. of 1,4-pregnadiene-17α,21-diol-3,11,20-trione is treated with 0.45 g. of furoyl chloride. The crude product is crystallized from benzene-methanol and gives either of two forms, M. P. 233–235° C. and M. P. 251–254° C.

*Example 18.—1,4-pregnadiene-17α,21-diol-3,11,20-trione 21-(4'-tert. butylphenoxyacetate)*

As in Example 3, 3 g. of 1,4-pregnadiene-17α,21-diol-3,11,20-trione is treated with 2.37 g. of 4-tert. butyl-phenoxyacetyl chloride. Crystallization of the crude product from dilute methanol gives the desired ester, M. P. 130–135° C. (loss of solvate).

*Example 19.—1,4-pregnadiene-17α,21-diol-3,11,20-trione 21-phenoxyacetate*

As in Example 3, 1 g. of 1,4-pregnadiene-17α,21-diol-3,11,20-trione is treated with 0.6 g. of phenoxyacetyl chloride. The crude product is crystallized from methanol, M. P. 205–207° C.

*Example 20.—1,4-pregnadiene-17α,21-diol-3,11,20-trione 21-(5'-tert. butylfuroate)*

As in Example 3, 3 g. of 1,4-pregnadiene-17α,21-diol-3.11,20-trione is treated with 1.95 g. of 5-tert. butylfuroyl chloride. The crude is crystallized from aqueous methanol to give the desired product, M. P. 241–243° C.

We claim:

1. 21-esters of $\Delta^1$-cortical hormones of the group consisting of 1-dehydrocortisone and 1,4-pregnadiene-11β,17α,21-triol-3,20-dione, with acids of the group consisting of phenyloxy-lower-alkanoic acids and furoic acid and the lower alkyl, lower alkoxy, chloro- and bromo-substitution products of said acids.

2. 21-esters of $\Delta^1$-cortical hormones as defined in claim 1 wherein the acid is a lower-alkylphenoxyacetic acid.

3. 21-esters of $\Delta^1$-cortical hormones as defined in claim 1 wherein the acid is furoic acid.

4. 21-esters of $\Delta^1$-cortical hormones as defined in claim 1 wherein the acid is a halofuroic acid wherein halo is a halogen of atomic number not less than 17 and not more than 35.

5. 21-esters of $\Delta^1$-cortical hormones as defined in claim 1 wherein the acid is a lower-alkylfuroic acid.

6. 1,4 - pregnadiene - 11β,17α,21 - triol - 3,20 - dione 21 - (5' - tert. butylfuroate).

7. 1,4 - pregnadiene - 17α, 21 - diol - 3,11,20 - trione 21 - (5'-tert. butylfuroate).

8. 1,4 - pregnadiene - 17α,21 - diol - 3,11,20 - trione 21-furoate.

9. 1,4-pregnadiene - 17α,21 - diol - 3,11,20 - trione 21-(5'-bromofuroate).

10. 1,4 - pregnadiene - 17α,21 - diol - 3,11,20 - trione 21-(4'-tert. butylphenoxyacetate).

References Cited in the file of this patent

UNITED STATES PATENTS

| | | |
|---|---|---|
| 2,579,479 | Djerassi | Dec. 25, 1951 |
| 2,671,092 | Djerassi | Mar. 2, 1954 |
| 2,705,237 | Djerassi | Mar. 29, 1955 |
| 2,734,056 | Miescher | Feb. 7, 1956 |

FOREIGN PATENTS

| | | |
|---|---|---|
| 503,963 | Canada | 1954 |